United States Patent [19]

Murakami et al.

[11] Patent Number: 5,057,940

[45] Date of Patent: Oct. 15, 1991

[54] IMAGE SIGNAL ENCODING/DECODING SYSTEM

[75] Inventors: Tokumichi Murakami; Takahiro Fukuhara, both of Kanagawa, Japan

[73] Assignee: Mitsubishi Denki Kabushiki Kaisha, Tokyo, Japan

[21] Appl. No.: 592,582

[22] Filed: Oct. 4, 1990

[30] Foreign Application Priority Data

Apr. 10, 1989 [JP] Japan .................................. 1-259476

[51] Int. Cl.$^5$ .............................................. H04N 1/41
[52] U.S. Cl. .................................. 358/426; 358/462; 358/464; 358/467
[58] Field of Search ................ 358/426, 462, 464, 467

[56] References Cited

U.S. PATENT DOCUMENTS

| 4,663,995 | 5/1987 | Chem et al. | 358/462 |
| 4,914,524 | 4/1990 | Kimura | 350/464 |
| 4,979,049 | 12/1990 | Chamzas et al. | 358/467 |

OTHER PUBLICATIONS

Ostermann et al., "Object-Oriented Analysis-Synthesis Coding Based on Moving 3-D Objects".
Galla et al., "Facial Features Extraction in Video Telephone Images".
Aizawa et al., "Model-Based Analysis Synthesis Image Coding System for very Low-Rate Image Transmission".

Primary Examiner—Edward L. Coles, Sr.
Attorney, Agent, or Firm—Wolf, Greenfield & Sacks

[57] ABSTRACT

An image signal transmitting and receiving system for encoding image signals to be transmitted from a transmission side to a receiver side and for decoding the received encoded image signals at the receiver side is described wherein the transmission side includes an object image extracting circuit, encoding circuits for object and background images and a multiplexer, and the receiver side includes a demultiplexer, decoding circuits for object and background images and an image combining circuit. Input image signals are divided into object background signals at the extraction circuit and then are respectively encoded at the encoding circuits. The encoded object and background signals are transmitted by way of the multiplexer and respectively input to the object and background decoding circuits through demultiplexer to provide respective decoded signals. The decoded signals are combined at the combining circuit to provide the whole image signals corresponding to the input image signals.

11 Claims, 8 Drawing Sheets

FEATURE POINT $m = 3/2 \times (3^n + 1)$

IMAGE SIGNAL ENCODING/DECODING SYSTEM

BACKGROUND OF THE INVENTION

1. Field of the Invention

The present invention relates to an encoding/decoding system, or transmission/reception system for image signals, adapted to transmit/receive image information with a high degree of efficiency.

2. Prior Art

Figure 1:
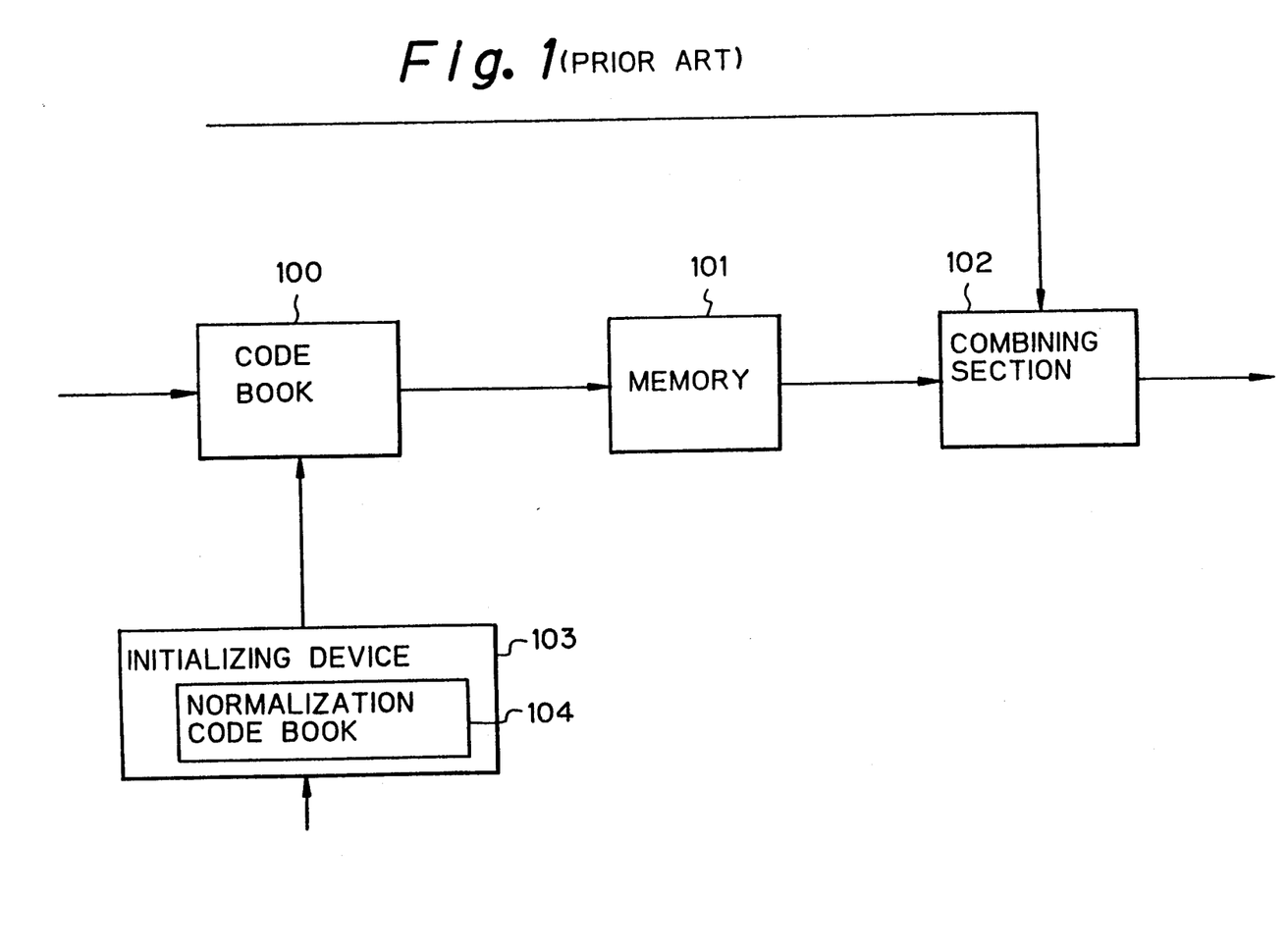
FIG. 1 is a block diagram illustrating an image information receiver apparatus according to a prior art.

FIG. 1 is a conceptual diagram showing a receiver side of a face image transmission and receiving system according to a prior art as disclosed in Japanese Patent Public Disclosure (KOKAI) No. 162492/89. In the drawing, numeral 100 designates a codebook which stores sets of parameter values of respective mouth shape model images which show geometrical characteristics of a mouth in response to phoneme signals, numeral 101 a memory which stores mouth shape image information of pixels of the mouth part defined by the respective sets of parameter values stored in the codebook 100, and numeral 102 a combining section adapted to modify the mouth shape image information read out from the memory 101 in accordance with the parameter values from the codebook 100 and to combine it with face image information excluding the mouth shape image information of pixels of the face part received from the transmission side. Numeral 103 denotes an initializing apparatus including a normalization codebook for initializing the codebook 100 in response to the initial face image information.

Figure 2:
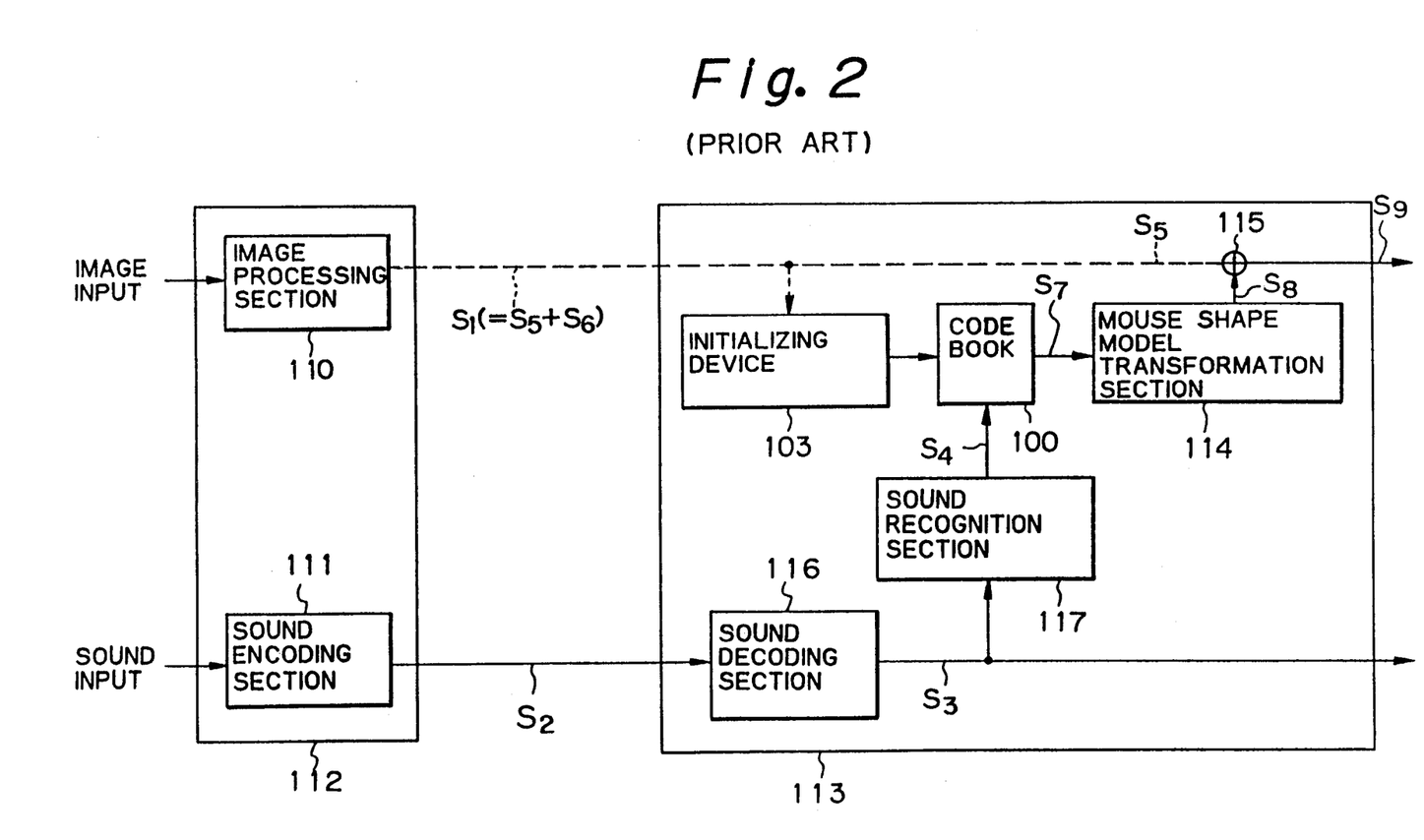
FIG. 2 is a block diagram showing an image information transmission and reception system according to a prior art.

FIG. 2 is a block diagram showing an image signal transmission and reception system incorporating such a receiver as shown in FIG. 1. In the drawing, numeral 112 designates a transmission side provided with an image processing section 110 and a sound encoding section 111 for generating and transmitting an encoded image and sound information $S_1$ and $S_2$ to a receiver side 113. In the receiver side 113, a mouth shape model transformation section 114 and a combining circuit 115 form the combination of the combining section 102 and memory 101 shown in FIG. 1. The receiver side 113 also comprises a sound decoding section 116 for decoding the encoded sound information $S_2$ from the transmission side 112 and a sound recognition section 117 for recognizing the decoded sound signal $S_3$ and generating a phoneme signal $S_4$ in response to the sound signal $S_3$.

Operation of the system shown in FIG. 2 will next be explained.

When face image information is input to the image processing section 110, it, in turn, extracts face image information $S_5$ other than that of the mouth and transmits such information without encoding to the combining section 115 in the receiver side. On the other hand, when the sound encoding section 111 receives sound input information, it outputs the encoded sound information $S_2$ to the sound decoding section 116 in the receiver side 113. The transmitted sound information is then decoded thereat and converted into the phoneme signal $S_4$ corresponding to the sound input information at the sound recognition section 117.

The codebook 100 outputs a set of parameter values $S_7$ of the mouth shape model image relative to the phoneme signal $S_4$ output from the sound recognition section 117 to the mouth shape model transformation section 114, and then a transformed mouth shape model image information $S_8$ dependent on the set of parameter values $S_7$ is provided to the combining circuit 115. At the circuit 115, the face image information $S_5$ other than the mouth shape model from the transmission side 112 and the transformed mouth shape model information $S_8$ are synthesized to output the whole face image output $S_9$. At the same time, the decoded sound output $S_3$ corresponding to the mouth shape model image is output from the decoding section 116.

In the prior encoding/decoding system for the image signals explained above, since the image information of the portions of the face other than the mouth part is transmitted as raw signals, it has been difficult to transmit an image at a low bit rate.

Further, since the mouth shape model image information are all dependent on the sound encoding and decoding sections and the sound recognition section, if an error is caused in these sections, the obtained mouth shape model image will not harmonize with the original face image other than the mouth, resulting in an incongruous image.

SUMMARY OF THE INVENTION

The present invention has been provided to eliminate the problems as mentioned above, and an aim of the invention is to provide an encoding/decoding system capable of transmitting the image signals at a low rate without being seriously distorted even if a certain rigorously moving parts appear in an image, or luminous values of the object image are largely changed due to for example variation of lighting conditions.

The object of the present invention as described above is attained by an encoding/decoding system wherein image information is separated into object image information and the other image information, such as face image information, background image information, mouth image information and so on. The object image information is transmitted to a receiver side after vector information values of pixels in respective patches which are the elements of the object image while the other image information is encoded and transmitted only when it is necessary to transmit it, for example at the first frame.

DESCRIPTION OF THE PREFERRED EMBODIMENTS

Figure 3:
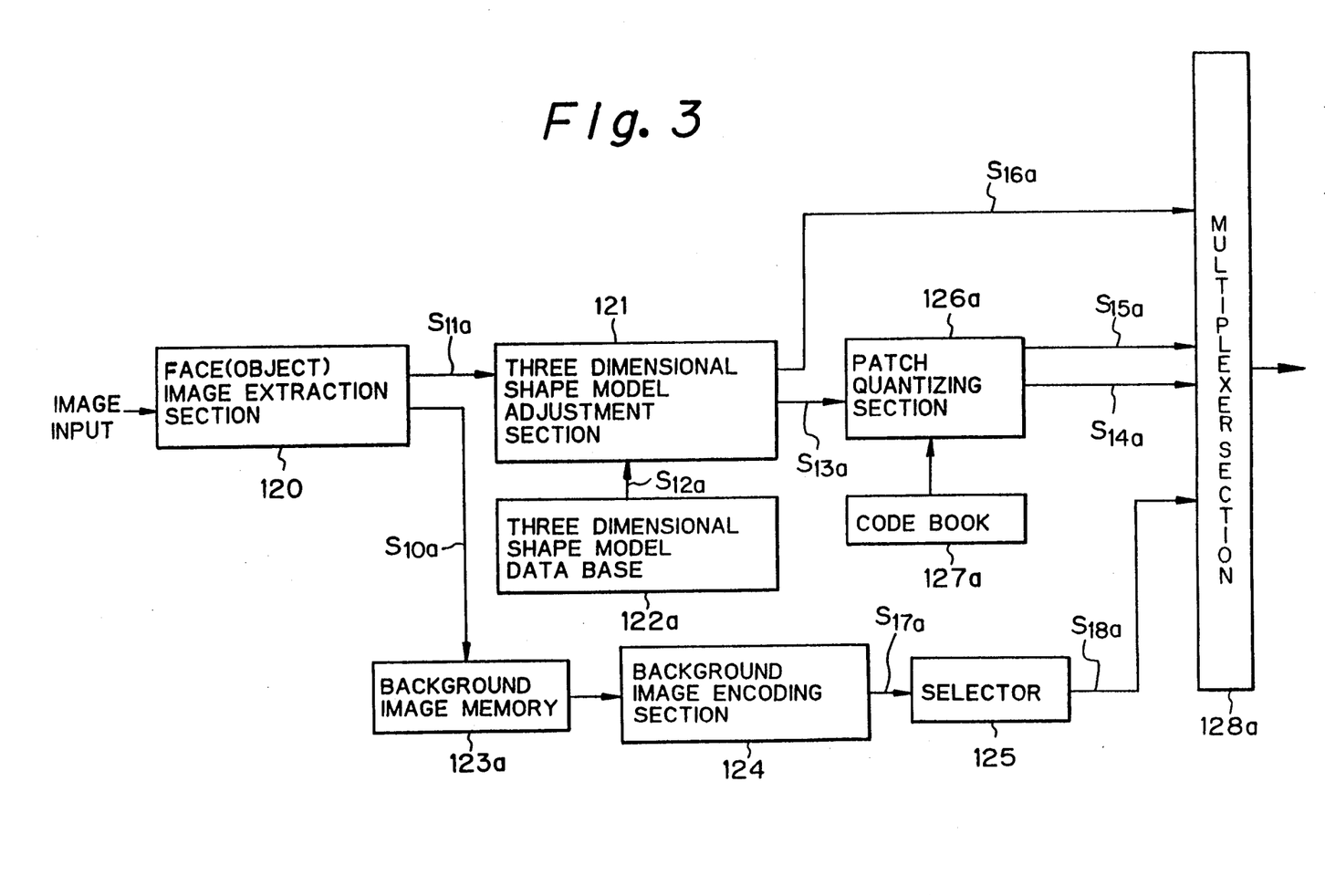
FIGS. 3 and 4 are block diagrams illustrating constitutions of image information encoder and decoder (transmission apparatus and receiver apparatus) according to the present invention.

FIG. 3 illustrates an embodiment of an encoding apparatus, or transmission apparatus according to the present invention adapted to encode and transmit image information, which consists of face (object) image information and background image information.

In the drawing, numeral 120 designates a face (object) image extraction section, 121 a three-dimensional shape model adjustment section, 122a a three-dimensional shape model adjustment section, 122a a three-dimensional shape model database, 123a a background image memory, 124 a background image encoding section, 125 a selector, 126a a patch quantizing section, 127a a codebook, and 128a a multiplexer section.

Figure 4:
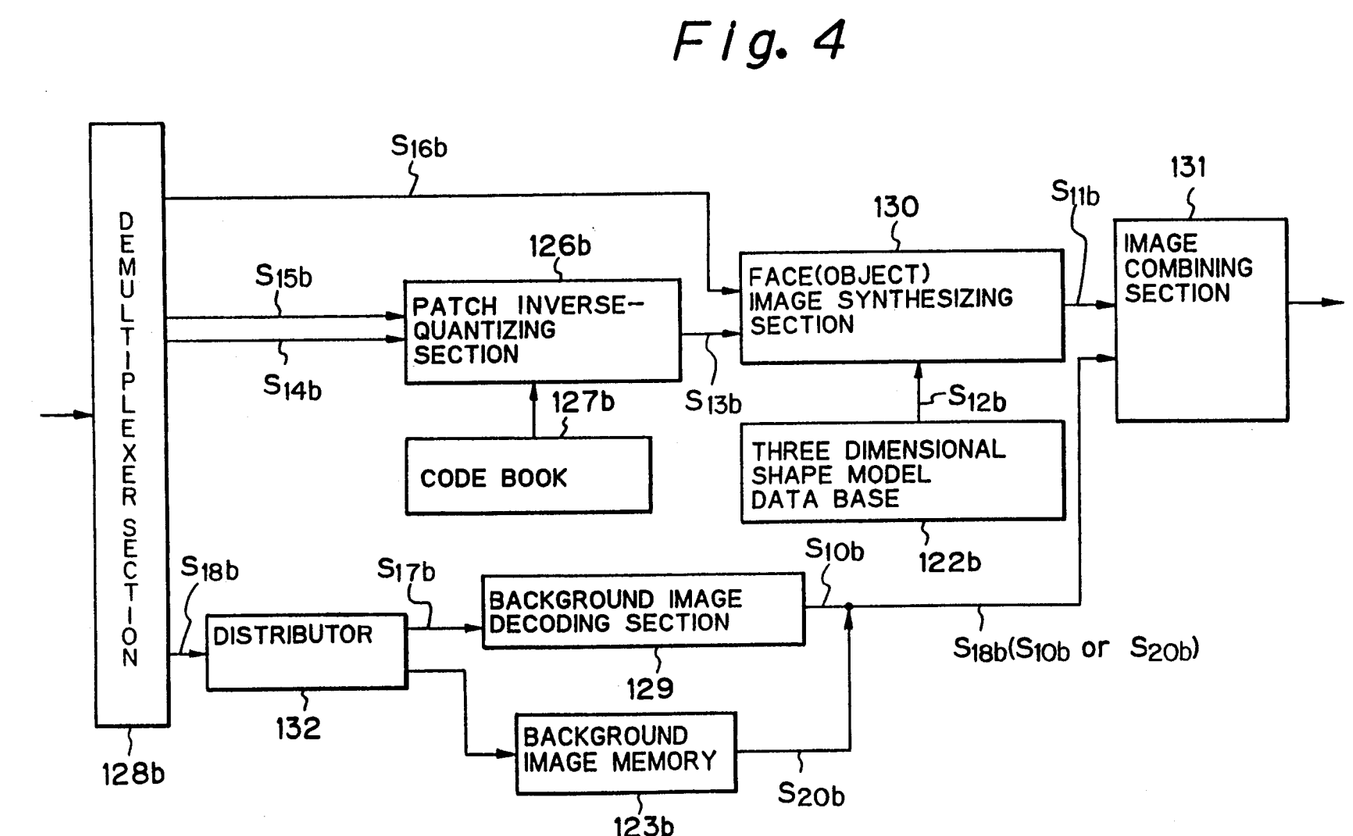

FIG. 4 shows an embodiment of a decoding apparatus, or receiver apparatus according to the present invention adapted to receive and decode the image information from the encoding apparatus shown in FIG. 3.

In FIG. 4, numeral 128b designates a demultiplexer section, 126b a patch inverse-quantizing section, 127b codebook, 130 a face (object) image synthesizing section, 122b a three-dimensional shape model database, 132 a distributor, 129 a background image decoding section, 123b a background image memory and 131 an image combining section.

Operation of the encoding and decoding apparatus shown in FIGS. 3 and 4 will next be explained.

Figure 5A:
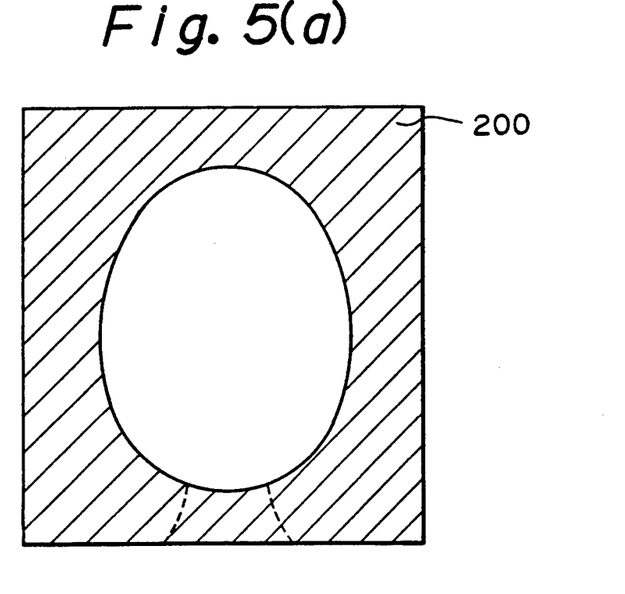
FIGS. 5(a) and 5(b) explain a background image and a face image which have been separated at a face (object) image extraction section shown in FIG. 3.
Figure 5B:
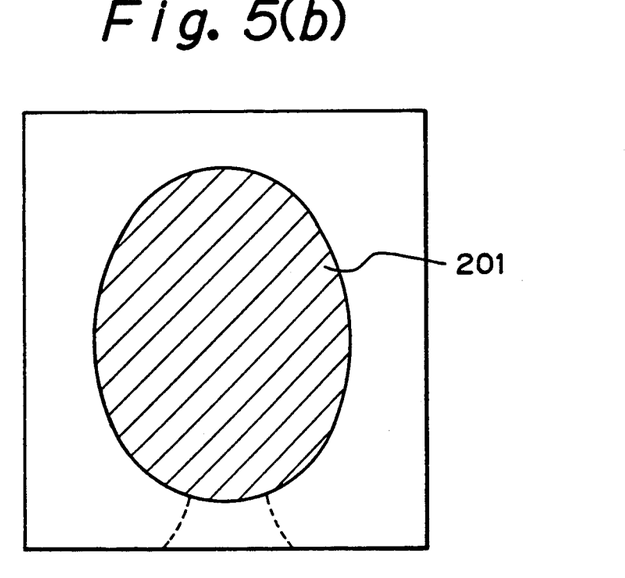
Figure 6:
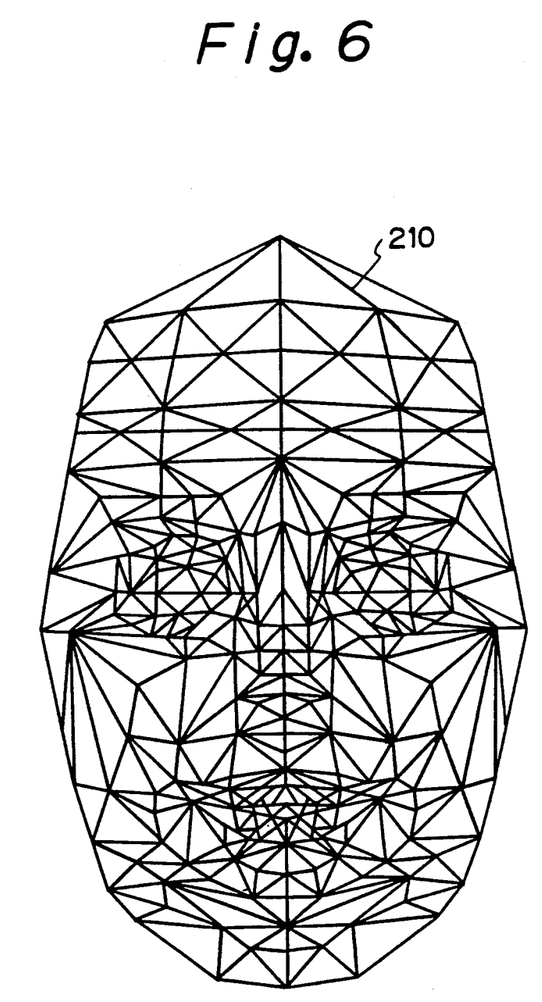
FIG. 6 shows a three-dimensional shape model.

In the encoding apparatus (in FIG. 3), image information representing an image of a human face is input to the face (object) image extraction section 120, and separated into background image information $S_{10a}$ and face image information $S_{11a}$ representing a background image 200 and a face image 201 as shown in FIGS. 5(a) and 5(b). These background and face image information $S_{10a}$ and $S_{11a}$ are respectively supplied from the section 120 to the background image memory 123a and the three-dimensional shape model adjustment section 121. The database 122a has registered predetermined three-dimensional shape model information $S_{12a}$ representing a three-dimensional shape model as shown in FIG. 6, and outputs it to the adjustment section 121.

The adjustment section 121 operates to adjust the three-dimensional shape model information $S_{12a}$ from the database 122a with the face image information $S_{11a}$ from the extraction section 120, and then outputs the adjusted face image information $S_{13a}$ to the patch quantizing section 126a.

At the quantizing section 126a, the adjusted face image information $S_{13a}$ is quantized in vector form for every patch, or polygon included therein, and then an index number $S_{14a}$ for each patch is determined by referring to the codebook 127a. The index number $S_{14a}$ is, for example, an address number of the vector in the codebook 127a, which gives the minimum distortion value $d_S$ compared with vectors stored.

It will next be explained in detail with regard to the minimum value $d_S$. When a triangle patch is divided into $4^n$ number of congruent triangles (n=0, 1, 2, 3, ...), number of the apexes of the whole congruent triangles is represented as $3(3^n+1)/2$. Using pixels at these apexes as feature points, luminous vector Y, color difference vectors $C_b$ and $C_r$ for the patch are expressed as follows:

$$Y = \{y_1, y_2, \ldots, y_j, y_m\}$$

$$C_b = \{c_{b1}, c_{b2}, \ldots, c_{bj}, c_{bm}\}$$

$$C_r = \{c_{r1}, c_{r2}, \ldots, c_{rj}, c_{rm}\}$$

wherein $m = 3(3^n=1)/2$; $y_j$, $c_{bj}$ and $c_{rj}$ are luminous value and color difference values of a feature point j (j=1, 2, 3, ..., m).

Figure 7A:
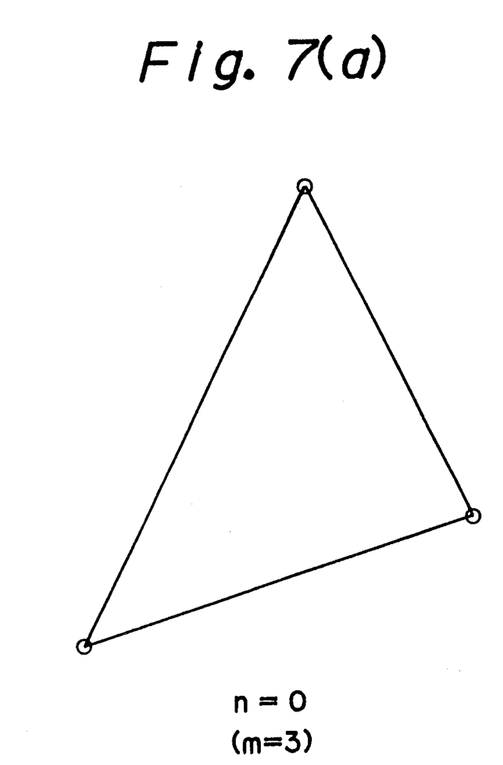
FIGS. 7(a)-7(c) show relationships between a patch (polygon) and feature points (m), in case of that the patch is divided into $4^n$ number of congruent triangles where n=0, 1 and 2 respectively.
Figure 7B:
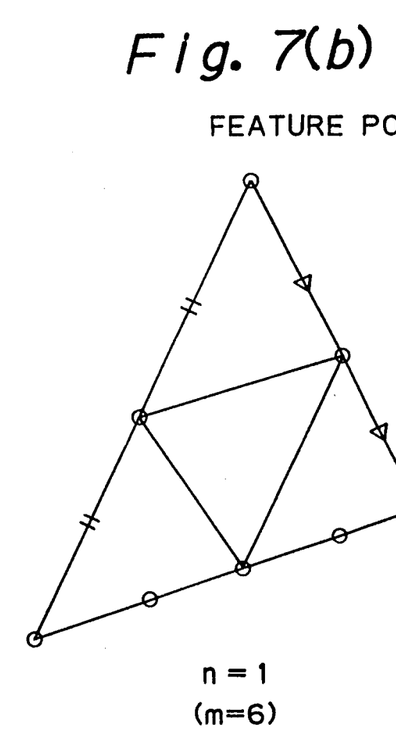
Figure 7C:
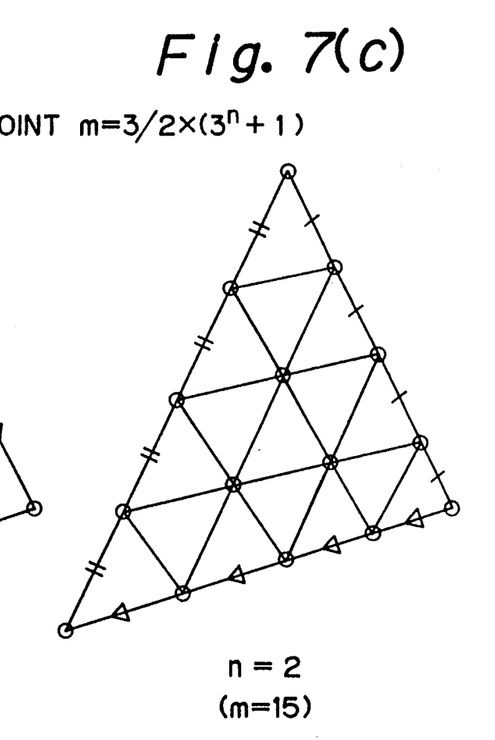

FIGS. 7(a)–7(c) show relationships between a patch and feature points taken in the above manner, where FIGS. 7(a)–7(c) respectively illustrate when n=0, 1 and 2, or m=3, 6 and 15.

Next, assuming that means of the respective luminous values ($y_j$) and color difference values ($c_{bj}$ and $c_{rj}$) are expressed as $\mu_y$, $\mu_{cb}$ and $\mu_{cr}$, and diffusion of the vector $Y = \{y_1, y_2, \ldots, y_j, \ldots, y_m\}$ is $\sigma$, means value separation normalized value $y_{ja}$ for $y_j$ and means value separation values $c_{bja}$ and $c_{rja}$ for $c_{bj}$ and $c_{rj}$ are represented as follows:

$$y_{ja} = (y_j - \mu_y)/\sigma$$

$$c_{bja} = c_{bj} - \mu_{cb}$$

$$c_{rja} = c_{rj} - \mu_{cr}$$

Accordingly, the following m-dimensional vectors are obtained for every patch:

$$Y_a = \{y_{1a}, y_{2a}, \ldots, y_{ja}, \ldots, y_{ma}\}$$

$$C_{ba} = \{c_{b1a}, c_{b2a}, \ldots, c_{bja}, \ldots, c_{bma}\}$$

$$C_{ra} = \{c_{r1a}, c_{r2a}, \ldots, c_{rja}, \ldots, c_{rma}\}$$

The patch quantizing section 126a further executes a dual distortion calculation for obtaining a dual distortion value $d_i$ by using the obtained vectors $Y_a$, $C_{ba}$ and $C_{ra}$ and each set of vectors stored in the codebook 127a as follows:

$$d_i = 1/m \left[ \sum_{j=1}^{m} \{y_{ja} - (y_{ja})_i\}^2 + \sum_{j=1}^{m} \{c_{bja} - (c_{bja})_i\}^2 + \sum_{j=1}^{m} \{c_{rja} - (c_{rja})_i\}^2 \right]$$

where $(y_{ja})_i$, $(c_{bja})_i$ and $(c_{rja})_i$ represent the values $y_{ja}$, $c_{bja}$ and $c_{rja}$ of the vectors stored at i numbered address in the codebook 127a. Furthermore, the section 126a detects the minimum dual distortion value $d_S$ in all of the values $d_1$, $d_2$, ..., $d_S$, ..., and then outputs the address value S as the index value to the multiplexer section 128a.

The mean values $\mu_y$, $\mu_{cb}$ and $\mu_{cr}$ and the diffusion value $\sigma$ for each of the patches are also output as mean and diffusion information $S_{15a}$ from the section 126a to the multiplexer section 128a.

On the other hand, the three-dimensional shape model information $S_{16a}$ as adjusted by the adjustment section 121 is expressed in the form of coordinates at apex points of each patch as shown in FIG. 6 and taken as the input to the multiplexer section 128a.

The background image information $S_{10a}$ separated by the image extraction section 120 is once recorded in the background image memory 123a and encoded with scalar-quantization at the background encoding section 124 to become background picture information $S_{17a}$ to be input to the selector 125.

The selector 125 selects either the background picture information $S_{17a}$ from the encoding section 124 or an appointment number indicating background image information which has been stored in the background picture memory 123b in the receiver side and output the selected one with a header bit signal to the multiplexer section 128a. When the former is output, the header bit signal is "1", and in the other case, the header bit is "0", for example.

In the above manner, the encoding operation is executed, and the encoded information are multiplexed at the multiplexer section 128a and then transmitted to the receiver side, or encoder side shown in FIG. 4.

At the receiver side, the demultiplexer section 128b separates the received multiplexed information into the three-dimensional shape model information $S_{16b}$, mean and diffusion information $S_{15b}$, index number information $S_{14a}$ and background output information $S_{18b}$, and provides these information to the face (object) image synthesizing section 130, patch inverse-quantizing section 126b and distributor 132. The inverse-quantizing section 126b detects the index information, or address number and extracts the m-dimensional vectors $Y_a$, $C_{ba}$, $C_{ra}$ from the codebook 127b by referring the detected index information. The section 126b then executes interpolation of the pixel values of the patch by using the input mean and diffusion value information $S_{15b}$. A gradient method is applied for the interpolation of the pixel values wherein Z coordinate values of the respective congruent triangles are set as the pixel values and Z coordinate value corresponding to an optional point in the three-dimensional space is calculated.

Figure 8A:
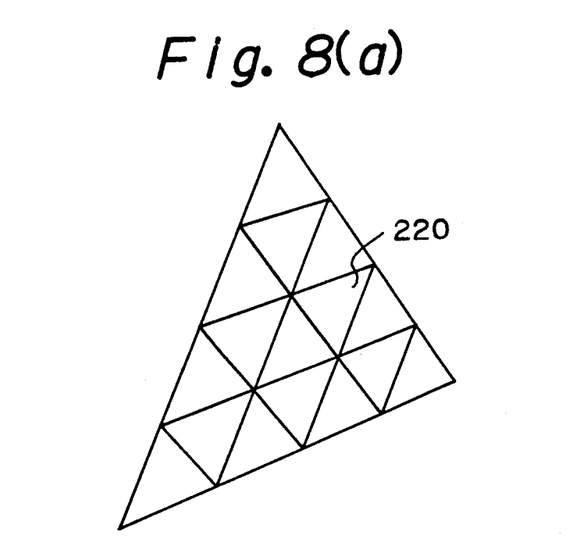
FIGS. 8(a) and 8(b) explain the concept of gradient method for calculating a pixel value at any point on a triangle obtained from a patch by congruent-division.
Figure 8B:
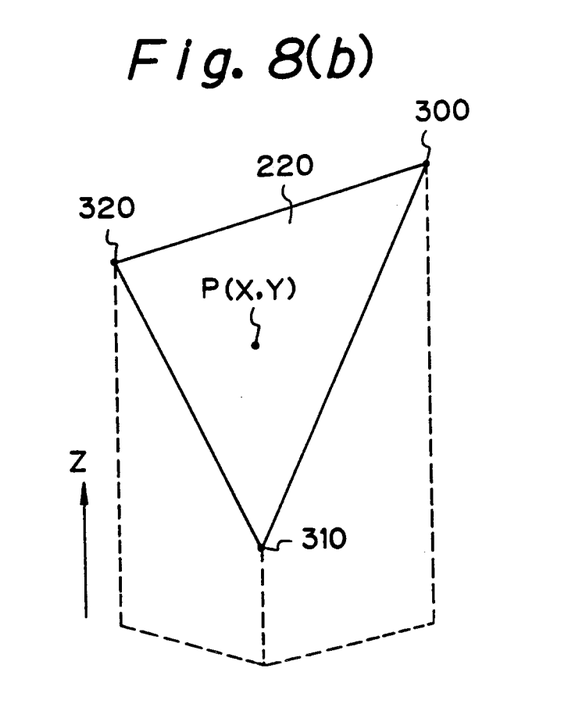

FIGS. 8(a) and 8(b) are explanatory diagrams showing the concept of the gradient interpolation method. FIG. 8(a) shows a patch which is divided into 16 (=$4^2$) congruent triangles and an enlarged view of one of the triangles 220 is shown in FIG. 8(b). Assuming that the triangle 220 is part of a plane existing in the three-dimensional space, pixel values of the apex points $P_0$, $P_1$ and $P_2$ thereof are $z_0$, $z_1$ and $z_2$ and X and Y coordinate values of these points are $(x_0, y_0)$, $(x_1, y_1)$ and $(x_2, y_2)$, the following equations are derived:

$$ax_0+by_0+cz_0+d=0$$

$$ax_1+by_1+cz_1+d=0$$

$$ax_2+by_2+cz_2+d=0$$

By solving the above equations with regard to a, b, c, and d, the values of a–d are derived, and therefore the equation of the plan on which the points $P_0(x_0, y_0, z_0)$, $P_1(x_1, y_1, z_1)$ and $P_2(x_2, y_2, z_2)$ are located. Accordingly, for any point P on the triangle having coordinate values x, y and z, the value z can be provided by the following equation using the derived values a–d:

$$z=-(d+ax+by)/c$$

Accordingly, the pixel value at any point P in a triangle represented by the value z can be definitely obtained by using the above equation.

The above determination of the pixel value z is done for every pixels in each of patches of the face image so that the patch adjustment face image is provided and output from the patch inverse-quantizing section 126b to the face (object) image synthesizing section 130. The section 130 also receives the three-dimensional model information $S_{16b}$ representing coordinate values (X, Y) on the actual frame from the demultiplexer section 128b and forms a face (object) image information $S_{11b}$ for one frame by referring to the actual frame coordinate values $S_{16b}$.

The image combining section 131 receives the face (object) image information $S_{11b}$ and background picture information $S_{20b}$ read out from the background memory 123b or decoded background picture information $S_{10b}$ from the decoding section 129, in accordance with the output from the distributor 132. The distributor 132 automatically controls the conduction of the encoded background information $S_{18b}$ from the demultiplexer section 128b to either the memory 123b or the decoding section 129 in response to the header bit value added thereto. The combining section 131 combines these received information $S_{11b}$ and $S_{18b}$ ($S_{10b}$ or $S_{20b}$) to provide the final output image information.

In the embodiment of an encoding apparatus described above, square distortion calculation is executed at the patch quantizing section 126a with respect to the input vectors and the sets of vectors stored in the codebook 127a, and the index of the vectors which provides minimum distortion taken as the quantized output. However, it is also possible that the minimum distortion is compared with a threshold value, and when the former is larger than the threshold value, vector-quantization is not executed but information obtained by scalar-quantizing and the scalar quantized information is transmitted to the decoder side. This operation may achieve the same result as that of the first embodiment.

Furthermore, although a human face image has been discussed as the object image in the embodiment, other objects may be applied.

As explained above, according to the present invention, since the input image is separated into the object image and the background image, and the background image is transmitted only when required, whereby the volume of transmission information may be reduced. As to the object image, after the three dimensional shape model is adjusted, mean value separation normalizing vector-quantization is executed at the patch quantizing section by using a multiplicity of vector patterns for the respective patches stored in the code book and therefore images of a high quantity may not only be transmitted without being affected by rigorous movement of the object and change in the illumination condition but may also be transmitted at a low bit rate. Further, since the normalized vectors have been registered in the codebook, a shape image may be transferred with little reflection of the statistical nature of the input image. Furthermore, since the object image may be combined with any optional background image stored in the background image memory in the receiver side, an image constitution effect is higher than in that of the prior art.

It is further understood by those skilled in the art that the foregoing description is a preferred embodiment of the disclosed device and that various changes and modifications may be made in the invention without departing from the spirite and scope thereof.

What is claimed is:

1. An encoding/decoding system for encoding image signals to be transmitted from a transmission apparatus to a receiver apparatus, and for decoding the received encoded image signals, wherein said transmission apparatus comprises:

object image extracting means for separating input image signals into background image information and object image information;

first encoding means for encoding said object image information provided from said extracting means;

second encoding means for encoding said background image information provided from said extracting means;

selector means for selectively outputting as background picture information either said encoded background image information from said second encoding means or instruction information representing that no background image information is being transmitted; and multiplexer means for multiplexing said encoded object image information from said first encoding means and said background picture information from said selector means and for transmitting the multiplexed information to said receiver apparatus; and said receiver apparatus comprises:

demultiplexer means for demultiplexing the received information into said encoded object image information and said background picture information which is either said encoded background image information or said instruction information;

distributor means for detecting whether said background picture information from said demultiplexer means is said encoded background image information or said instruction information and for outputting the detected information;

background image memory means for storing predetermined background image information and for reading out said predetermined background image information when said instruction information is received from said distributor means;

second decoding means for decoding said encoded background image information when it is received from said distributor means; and image combining means for providing a final image signal by combining said decoded object image information from said first decoding means and either said decoded background image information from said second decoding means or said predetermined background image information from said image memory means.

2. A system according to claim 1, wherein said first encoding means comprises:

a first database storing three-dimensional shape model information which represents a three-dimensional shape model of an object image consisting of a plurality of patch elements;

a three-dimensional shape model adjustment section for adjusting said three-dimensional shape model information read out from said database with said object image information to provide patch adjusted object information; and a patch quantizing section for determining a plurality of feature points in each of the patch elements of the adjusted object image represented by said patch adjusted object information from said adjustment section, and for quantizing in vector form pixel values of said feature points for every patch element by referring to vectors read out from a first codebook to provide said encoded object image information.

3. A system according to claim 2, wherein said quantizing section comprises:

means for forming at least one multi-dimensional vector on the basis of said patch adjust object information;

means for calculating a square distortion value between said formed multi-dimensional vector and each of vectors read out from a first codebook; and means for detecting the minimum square distortion value among said calculated distortion values to provide an address value as said encoded object image information, an address corresponding to said address value stores the vector associated with said minimum square distortion value.

4. A system according to claim 2 or 3, wherein said respective patch elements are triangles and said patch quantizing section determines said feature points such that said feature points in said patch element are located on vertexes of each congruent triangle formed by congruously dividing said patch element.

5. A system according to claim 2 or 3, wherein said first decoding means comprises:

a patch reverse-quantizing section connected to receive said index information through said demultiplexer means for reversely quantizing said index information by referring to a second codebook which stores the same vectors as said first codebook in said transmission apparatus to provide said patch adjusted object information;

a second database storing the same three-dimensional shape model information as said first data base in said transmission apparatus; and an object image synthesizing section for synthesizing said patch adjusted object information from said patch reverse-quantizing section and said three-dimensional shape model information from said second data base to provide said object image information.

6. A system for encoding image signals comprising:

object image extracting means, for separating input image signals into background image information and object image information;

first encoding means, for encoding said object image information, providing encoded object image information;

second encoding means for encoding said background image information, providing encoded background image information;

selector means, for selectively outputting as background picture information either said encoded background image information from said second encoding means or instruction information representing no background image information is being transmitted; and multiplexer means, for multiplexing said encoded object image information from said first encoding means and said background picture information from said selector means.

7. A system according to claim 6, wherein said first encoding means comprises:

a database, storing 3-dimensional shape model information which represents a 3-dimensional shape model of an object image comprising a plurality of patch elements;

a 3-dimensional shape model adjusting section, for adjusting said 3-dimensional shape model information read out from said database with said object image information to provide adjusted object patch information corresponding to each of said plurality of patch elements; and a patch quantizing section, for determining a plurality of feature points in each of said plurality of patch elements of said adjusted object patch information from said adjustment section, and for quantizing pixel values in vector form for said plurality of feature points in each of said plurality of patch elements by referring to vectors read out from a codebook to provide said encoded object image information.

8. A system according to claim 7, wherein said patch quantizing section comprises:

means for forming at least one multi-dimensional vector on the basis of said adjusted object path information;

means for calculating square distortion values between said multi-dimensional vector and each of said vectors read out from said codebook; and means for detecting a minimum square distortion value among said square distortion values to provide an address value for said encoded object image information, said address value corresponding to an address at which said codebook stores a vector associated with said minimum square distortion value.

9. A system according to claim 7 or 8, wherein said patch elements are triangles and said patch quantizing section determines said feature points such that said feature points in said patch elements are located on vertexes of each congruent triangle formed by congruously dividing said patch element.

10. A system for decoding image signals comprising:

demultiplexer means, for demultiplexing said image signal into encoded object image information, comprising index information, and background picture information, comprising either encoded background image information or instruction information;

distributor means, for detecting whether said background picture information from said demultiplexer means is said encoded background image information or said instruction information, and for providing said encoded background image information or said instruction information;

background image memory means, for storing predetermined background image information and for reading out said predetermined background image information when said instruction information is received from said distributor means;

first decoding means, for decoding said encoded object image information, providing decoded object image information;

second decoding means, for decoding said encoded background image information, providing decoded background image information; and image combining means, for providing a final image signal by combining said decoded object image information and either said decoded background image information or said predetermined background image information.

11. A system according to claim 10, wherein said first decoding means comprises:

a database storing 3-dimensional shape model information; and which represents a 3-dimensional shape model of an object image comprising a plurality of patch elements;

a patch inverse-quantizing section, for inversely quantizing said index information by referring to a codebook which stores vectors representing pixel values of feature points in each of said elements of an object image to provide adjusted object patch information;

an object image synthesizing section, for synthesizing said adjusted object patch information from said patch inverse-quantizing section and said 3-dimensional shape model information from said database to provide said decoded object image information.

* * * * *

UNITED STATES PATENT AND TRADEMARK OFFICE
CERTIFICATE OF CORRECTION

PATENT NO. : 5,057,940
DATED : October 15, 1991
INVENTOR(S) : Tokumichi Murakami; Takahiro Fukuhara It is certified that error appears in the above-identified patent and that said Letters Patent is hereby corrected as shown below: On the title page:

Please change the priority date of the Japanese application from "April 10, 1989" to -- October 4, 1989 --.

Signed and Sealed this

First Day of June, 1993

Attest:

MICHAEL K. KIRK

Attesting Officer

Acting Commissioner of Patents and Trademarks